Nov. 21, 1967  E. L. ERICKSON  3,353,622
NEAR-SURFACE VELOCITY LOGGER
Filed Aug. 20, 1962  2 Sheets-Sheet 2

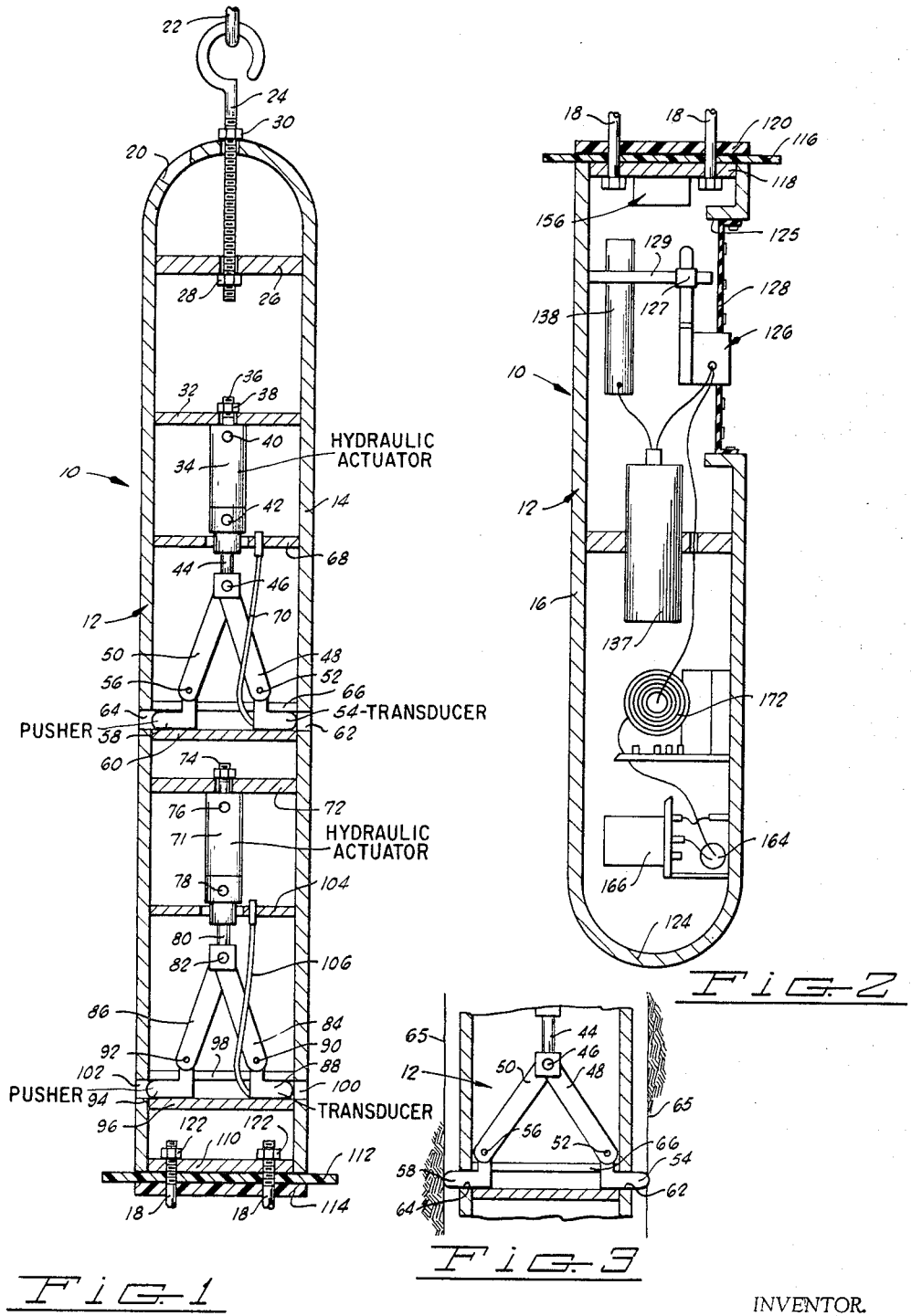

INVENTOR.
EVERETT L. ERICKSON
BY
ATTORNEY

United States Patent Office 3,353,622
Patented Nov. 21, 1967

3,353,622
NEAR-SURFACE VELOCITY LOGGER
Everett L. Erickson, Ponca City, Okla., assignor to Continental Oil Company, Ponca City, Okla., a corporation of Delaware
Filed Aug. 20, 1962, Ser. No. 218,035
1 Claim. (Cl. 181—.5)

The present invention relates to seismographic surveying, and more particularly but not by way of limitation, relates to a downhole tool for measuring the velocity at which seismic waves travel through the subterranean formations adjacent a well hole.

As is well known in the seismographic surveying art, conventional seismic time data obtained by generating a seismic signal at the surface and measuring the time required for the seismic reflections to return from the subterranean interfaces cannot be accurately interpreted unless the velocity at which the seismic waves travel through the various formations is known. One of the most common methods for determining these velocities is to lower a "sonic velocity logger" into a well in the general area of the survey. A seismic signal is generated in the well and the time required for the signal to travel through the formation between two detectors is recorded to determine the velocity of the seismic signal or velocity of sound of the formation. The prior art sonic loggers operate with reasonable accuracy at greater depths where the formations are highly compressed and have high sonic velocities. However, the previously used sonic velocity loggers depend upon a fluid, usually water, standing in the well bore to transmit the generated seismic signals to the formation and also depend upon the water to transmit the seismic signal from the formation back to the seismic signal detectors. Therefore, the minimum velocity which the prior art loggers can measure is limited by the fact that a refracted sonic wave results only when a sonic wave passes from a low velocity medium to a higher velocity medium. Since the velocity of sonic waves in water is approximately 5,000 feet per second, this type of logger is incapable of measuring the wave velocities of formations less than 5,000 feet per second, both because a sonic wave will not be refracted from the formation back through the water to the detectors and because the first sonic arrivals at the detectors will have traveled through the water standing in the well bore. As is well known, the sonic velocities for the near-surface strata fall well below 5,000 feet per second in most cases, particularly in the very shallow "weathered" layers.

Therefore, it is a primary purpose of the present invention to provide a downhole logger for measuring sonic wave velocities as low as 1,100 feet per second, and which is therefore particularly well suited for measuring the sonic velocities in the region near the surface of the earth. The logging device constructed in accordance with the present invention comprises, in general, an elongated casing having a longitudinal axis and a maximum diameter sufficiently small as to be lowered through a well bore. A pair of detectors are carried by the casing at spaced points along the longitudinal axis, and means are provided for moving each of the detectors from the casing into contact with the walls of the well bore. A means for generating a seismic signal is also carried by the casing. Suitable means is usually located at the surface and is connected to the detectors for measuring the time interval required for the sonic wave generated in the well bore to travel through the formation between the two detectors. Accordingly, the detectors may be coupled directly to the walls of an uncased, dry well bore and any sonic velocity greater than approximately 1,100 feet per second, which is the velocity of sonic waves in air, may then be measured. Additional aspects of the present invention are pointed out with particularity in the appended claims, and it should be understood that the appended claims define the sole limitations upon the invention.

Therefore, the principal object of the present invention is to provide method and apparatus for measuring the relatively slow sonic velocities of the near-surface layers of the earth.

Another object of the present invention is to provide a velocity logging tool of the type described which will operate in either a dry or wet well bore.

A further object of the present invention is to provide a means for coupling a sonic wave detecting transducer directly to the wall of a well bore.

Many additional objects and advantages of the present invention will be evident to those skilled in the art from the following detailed description and drawings, wherein:

FIG. 1 is a longitudinal, sectional view of the upper half of a downhole sonic velocity logging tool constructed in accordance with the present invention;

FIG. 2 is a longitudinal, sectional view of the lower half of the downhole sonic velocity logging tool constructed in accordance with the present invention;

FIG. 3 is a sectional view of a part of the logging tool shown in FIG. 1 with the detecting transducers extended into engagement with the walls of a well bore; and, FIG. 4 is an electrical circuit diagram of the downhole velocity logging tool constructed in accordance with the present invention.

Figure 4:
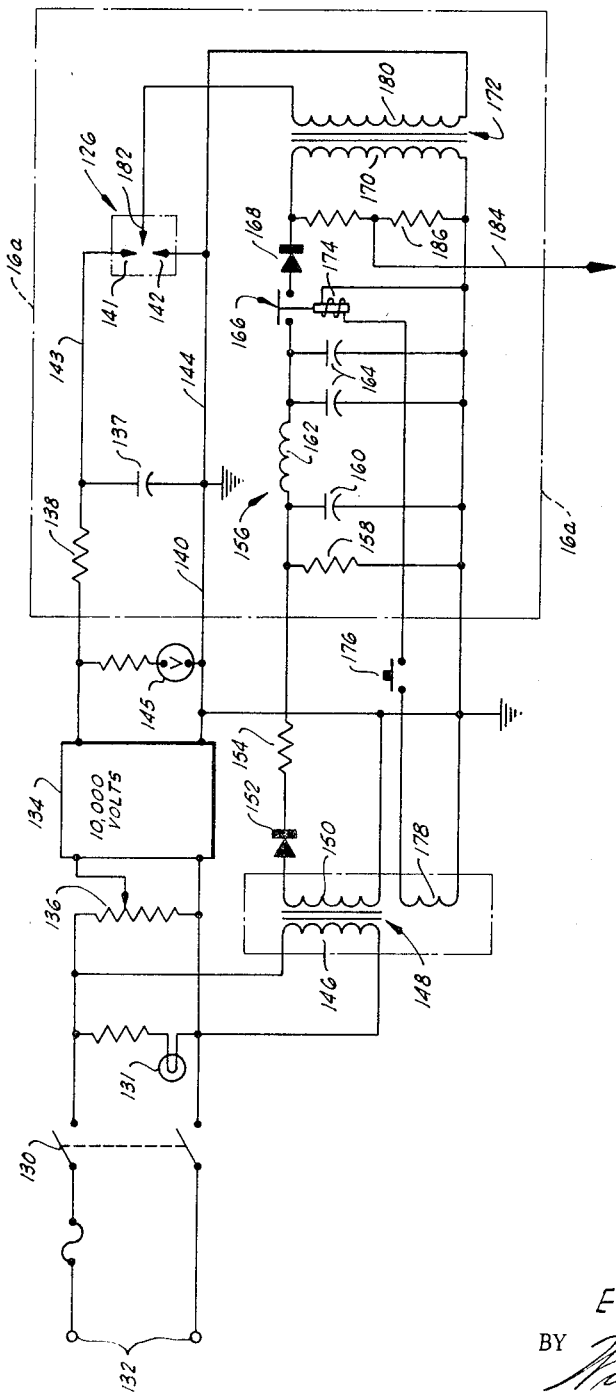

Referring now to the drawings, a downhole sonic velocity logger constructed in accordance with the present invention is indicated generally by the reference numeral 10 and comprises both of the sections shown in FIGS. 1 and 2 which are broken apart for convenience of illustration. The logger 10 is comprised generally of a two piece, elongated casing, indicated generally by the reference numeral 12, which is comprised of an upper half 14 (FIG. 1) and a lower half 16 (FIG. 2). The halves 14 and 16 are in actuality connected together by a plurality of bolts 18, as hereafter described in greater detail.

The upper half 14 of the casing 12 is provided with a control lead access opening 20 through which all electrical and hydraulic control cables, hereafter described, may pass. However, for convenience, none of the electrical cables and hydraulic conduits extending to the surface of the earth are illustrated, it being understood that these members are routed in any suitable and convenient manner through the interior of the casing 12 to the various internal components to be controlled and operated, as will hereafter be described in greater detail. The device 10 may be lowered into a well bore by a suspension cable 22 which is connected to a hook 24. The threaded shank of the hook 24 extends into the interior of the casing 12 and is connected to a plate 26 by a nut 28. The plate 26 is secured within the casing by welding or any other suitable means. A second nut 30 may be provided outside the casing 12 to lock both nuts against loosening.

A second support plate 32 is secured by welding within the casing 12 and supports a hydraulic linear actuator or motor 34 by means of a threaded stud 36 and nut 38. The hydraulic linear actuator 34 has a pair of ports 40 and 42 and a downwardly extending piston rod 44. It will be evident to those skilled in the art that upon introduction of power fluid to the port 40, the piston rod 44 will be lowered, and upon introduction of power fluid to the port 42, the piston rod 44 will be raised. The lower end of the piston rod 44 is pivotally connected by a pin 46 to a pair of actuating arms 48 and 50. The actuating arm 48 is connected by a pivot pin 52 to a piezoelectric transducer assembly 54. The actuating arm 50 is similarly connected by a pivot pin 56 to a pusher shoe assembly 58 which may have the same general shape and outline as the transducer assembly 54. Both the transducer assembly 54 and the shoe assembly 58 rest upon a slide plate 60 which is secured in the casing 12 by welding. A pair of apertures 62 and 64 are provided in the walls of the casing 12 which permit the outer ends of the assemblies 54 and 58 to protrude therethrough and engage the walls 65 of the well bore substantially as illustrated in FIG. 3 and as will be presently described. A pair of guide members 66, only one of which is illustrated, are disposed on each side of the assemblies 54 and 58 to insure that the assemblies remain diametrically opposed within the casing and properly aligned with the apertures 62 and 64. Thus, it will be evident that when the piston rod 44 is lowered by the linear actuator 34, the actuating arms 48 and 50 will force the assemblies 54 and 58 to slide over the slide plate 60 and move outwardly through the apertures 62 and 64, respectively, to engage the walls 65 of the well bore, as illustrated in FIG. 3. A support plate 68 may be positioned around the lower end of the linear actuator 34 to maintain the actuator aligned and to support flexible electrical leads 70 extending to the moveable transducer assembly 54. As previously mentioned, for convenience of illustration neither the hydraulic fluid conduits connected to the ports 40 and 42 nor the electrical leads extending from the leads 70 to the surface are shown.

A second hydraulic linear actuator 71 is suspended from a welded plate 72 by a threaded stud and a nut 74. The linear actuator 71 has a pair of fluid ports 76 and 78 and a downwardly extending piston rod 80 which is pivotally connected by a pivot pin 82 to a pair of actuating arms 84 and 86. The actuating arm 84 is connected to a piezoelectric transducer assembly 88 by a pivot pin 90, and the actuating arm 86 is connected by a pivot pin 92 to a pusher shoe assembly 94. A second slide plate 96 is suitably secured, such as by welding, within the casing 12 and the assemblies 88 and 94 are maintained in diametrically opposite positions by a pair of guide members 98, only one of which is illustrated. A pair of apertures 100 and 102 are provided in opposite sides of the casing 12 such that when the piston rod 80 is lowered by the introduction of power fluid to the port 76, both the transducer assembly 88 and pusher shoe assembly 94 will be moved outwardly through the apertures 100 and 102, respectively, into engagement with the walls of the well bore in the same manner as the similar assemblies illustrated in FIG. 3. A support plate 104 may be secured within the casing 12 around the lower end of the linear actuator 71 to maintain the actuator properly aligned and to support electrical leads 106 extending to the moveable transducer assembly 88. As previously mentioned, the fluid conduits which supply power fluid to ports 76 and 78 of the linear actuator 71 are not illustrated, but are understood to extend through the casing 12 and out the access opening 20 to the surface of the earth. In this connection, a single fluid conduit (not illustrated) may be connected to both the upper ports 40 and 76 of the actuators 34 and 71, respectively, and another single fluid conduit (not illustrated) connected to both the lower ports 42 and 78, such that the linear actuators 34 and 71 will be operated in synchronism and the transducer assemblies 54 and 88 moved into engagement with the well bore walls and retracted into the casing 12 simultaneously.

A bottom plate 110 is welded in the lower end of the upper half 14 of the casing 12. A resilient baffle disc 112 having a diameter greater than the diameter of the casing 12, and preferably slightly greater than the diameter of the well bore, is sandwiched between the plate 110 and an acoustical insulating plate 114 which may be fabricated of a suitable plastic material. A second resilient baffle disc 116 is sandwiched between a top end plate 118, which is secured in the upper end of the lower half 16 of the casing 12, and a second acoustical insulating plate 120. When that portion of the logger 10 shown in FIG. 1 is mated with the portion of the logger shown in FIG. 2, the acoustical insulating plates 114 and 120 are in abutting relationship and the bolts 18 extend through the plate 118, the baffle disc 116, the two acoustical plates 120 and 114, the baffle disc 112 and the plate 110 and are secured by nuts 122.

The lower end 124 of the lower half 16 of the casing 12 is closed in any suitable manner. A relatively large aperture 125 is formed in the side of the casing 12 adjacent the upper end, and a sonic signal generating mechanism, indicated generally by the reference numeral 126, protrudes from the aperture. A flexible diaphragm 128 seals the aperture 125 around the sonic signal generating mechanism 126. The generating mechanism 126 is adjustably mounted by a bracket 127 on a support rod 129 which is secured to the opposite side of the casing 12. The sonic signal generating mechanism 126 and the other components illustrated within the lower half 16 of the casing 12 are electrical components illustrated schematically in the circuit diagram of FIG. 4, and accordingly are designated by the same reference numerals, as will presently be described.

Referring now to FIG. 4, a master switch 130 completes an electrical circuit through the terminals 132 to a suitable AC power supply (not illustrated). An indicator light 131 may be connected across the switch 130 to indicate when the circuit is energized. A high voltage DC power supply 134 comprised of the necessary transformers and rectifiers is connected through a variable resistor 136 to the master switch 130. The DC power source 134 is connected to charge a main storage capacitor 137 through a resistor 138 and the necessary ground lead 140. The main storage capacitor 137 is then connected across the main spark gap comprised of electrodes 141 and 142 of the sonic signal generating mechanism 126 by the leads 143 and 144. A voltmeter 145 is provided to indicate the voltage across the main storage capacitor 137 and therefore across the main spark gap between the electrodes 141 and 142 prior to discharge, as hereafter described in greater detail.

The primary winding 146 of a transformer 148 is connected across the contacts of the master switch 130. One secondary winding 150 of the transformer 148 is connected through a diode 152 and a resistor 154 to a filter circuit, indicated generally by the reference numeral 156, which is comprised of the resistor 158, capacitor 160 and coil 162. The rectified current is then applied to a pair of storage capacitors 164 which are connected in parallel. The storage capacitors 164 are connected by the normally open contacts of a relay 166 and by a diode 168 to the primary winding 170 of a step-up transformer 172. The actuating coil 174 of the relay 166 is connected through a trigger switch 176 to the other secondary winding 178 of the transformer 148. The secondary winding 180 of the step-up transformer 172 is connected across an ionization electrode 182 and the ground electrode 142 of the sonic signal generating mechanism 126. A lead 184 for triggering the recording device presently to be described is connected to the center of the voltage divider network 186 which is connected across the primary winding 170 of the step-up transformer 172.

That portion of the circuit shown in the dotted outline 16a is housed within the lower half 16 of the downhole sonic velocity logging device 10 and the remainder of the circuitry is located at the surface. Of course, the necessary leads extend downwardly through the well bore, pass through the access opening 20 and through the casing 12 to the various components of the circuit. Referring to FIG. 2, the filter circuit 156 may conveniently be mounted on the plate 118. The resistor 138, the relay 166, the capacitors 164, the transformer 172 and the main storage capacitor 137 may all conveniently be connected by suitable brackets (not shown) to the walls of the lower half 16 of the casing 12.

*Operation*

In order to measure the velocity at which seismic or sonic waves travel through the near-surface layers of the earth, the fluids standing in a well bore, preferably having no casing, are bailed out until the bore hole is filled with air to a depth below that at which it is desired to measure the sonic velocities, and the velocity logging device 10 is then lowered into the bore hole. Upon reaching the desired depth, hydraulic power fluid is introduced to the ports 40 and 76 of the hydraulic linear actuators 34 and 71 so that the piston rods 44 and 80 will then be lowered. The actuating arms 48 and 50 will then force the transducer 54 and pusher shoe assembly 58, respectively, in opposite directions outwardly through the apertures 62 and 64 until each engages the opposite wall of the well bore. It will be noted that the pusher shoe assembly 58 will positively and firmly press the transducer assembly 54 against the wall of the well bore substantially as illustrated in FIG. 3. At the same time, the piston rod 80 will be lowered and the transducer assembly 88 and pusher shoe assembly 94 moved outwardly through the apertures 100 and 102, respectively, until each is pressed firmly against the well bore to positively couple the transducer assembly 88 to the wall of the well bore.

Next the master switch 130 is closed such that the main storage capacitor 137 will be charged to a maximum potential by the DC power source 134. The voltage across the main storage capacitor 137 may be visually monitored by the voltmeter 145. Similarly, the storage capacitors 164 will be charged through the power supply, which is comprised of the transformer 148 and diode 152, and through the filter circuit 156. When the trigger switch 176 is pressed to close the circuit to the coil 174, the relay 166 will be closed and the storage capacitors 164 will discharge through the primary winding 170 of the transformer 172. Also, a signal will be sent through the trigger lead 184 to the well head to actuate the recording apparatus which will hereafter be described in greater detail. The pulse from the discharge of the storage capacitors 164 through the primary winding 170 will induce a voltage on the order of 50,000 volts in the secondary winding 180 which will be applied between the ionization electrode 182 and the electrode 142. The very high voltage between the electrodes 182 and 142 will be sufficient to cause a spark. The spark will ionize the air adjacent the spark gap electrodes 141 and 142, thereby greatly reducing the resistance between the two electrodes. As the resistance is reduced, the main storage capacitor 137 will discharge across the electrodes 141 and 142 and cause an explosive heating of the air and thereby generate a sonic signal, as is generated by lightning or an explosion. The sonic signal will enter the adjacent wall of the well bore and will be propagated in all directions, including upwardly along the edge of the bore hole. The sonic signal will first pass the lower transducer assembly 88 and a few microseconds later will pass the transducer assembly 54. The piezoelectric elements of the transducer assemblies 88 and 54 generate an electrical signal as a result of the sonic signals and the electrical signals are transmitted to the surface for recordation by a suitable recording means (not illustrated).

The recording means for recording the two electrical signals froms the piezoelectric elements preferably comprises a conventional dual-trace oscilloscope (not illustrated) which provides separate visual presentations of the two electric signals as two sweep traces having a common time scale. The sweep traces of the oscilloscope may be started by the trigger signal from the lead 184 so that at some point on one of the traces a sharp pip will occur which will indicate the arrival time of the sonic signal at the lower transducer assembly 88, and a similar sharp pip will occur on the other trace after a short delay to indicate the arrival time of the sonic signal at the upper transducer assembly 54. The time lapse between the two pips will then be a direct measure of the time required for the sonic signal to travel between the two transducer assemblies 88 and 54. If the two transducer assemblies are spaced one foot apart, the sonic velocity of the particular formation can quickly and easily be computed in feet per second merely by calculating the reciprocal of the time expressed in seconds. The visual displays on the oscilloscope can be automatically recorded by any suitable still camera which can also be actuated, after a suitable delay, by the trigger pulse from the lead 184. After the measurement is made by photographing the traces, hydraulic power fluid is introduced through the ports 42 and 78 so as to move the piston rods 44 and 80 upwardly and thereby withdraw the respective transducer assemblies 58 and 88 and pusher shoe assemblies 58 and 94 into the casing 12. The velocity logging device is then raised the desired distance, the transducer assemblies extended into engagement with the walls 65 of the well bore, and the measuring sequence repeated.

It will be noted that the resilient baffle discs 112 and 116 will tend to prevent the sonic signal from traveling through the air column standing in the well bore and reaching the transducer assemblies 88 and 54. Although the baffles are preferred, it will be appreciated that they are not completely essential in that the sonic signal traveling through the air will arrive at the transducer assemblies 88 and 54 after the arrival of the sonic signal which travels through the adjacent formation so as not to materially interfere with the desired velocity determinations. However, since the waves would travel with a far greater velocity through the metallic casing 12, it is highly desirable that the casing 12 be fabricated in two halves which are acoustically insulated one from the other by the baffle discs 116 and 112 and the acoustical insulating plates 114 and 120. Then by locating the sonic signal generating mechanism 126 in one half of the casing and the transducer assemblies 88 and 54 in the other half, the likelihood that the sonic signal will be transmitted through the casing and thereby interfere with the velocity measurements is substantially eliminated.

From the above detailed description, it will be evident to those skilled in the art that a highly novel sonic velocity logging device has been described which is capable of measuring sonic velocities as low as 1,100 feet per second. Further, novel apparatus has been described for insuring that measuring transducers are positively coupled to the wall of the well bore. Therefore, although a specific embodiment of the present invention has been described and illustrated in detail, it is to be understood that various changes, substitutions and alterations can be made therein without departing from the spirit and scope of the present invention as defined by the appended claim.

What is claimed is:

A downhole sonic velocity logging device comprising:
an elongated casing having a longitudinal axis;
means connected to the casing for lowering the casing into a bore hole;
a pair of elongated guide means connected to the casing, the guide means being disposed at spaced points along the longitudinal axis and generally normal thereto;
a transducer slidingly associated with each of the guide means adjacent one side of the casing;
a pusher member slidingly associated with each of the guide means adjacent the other side of the casing;
a hydraulic actuator connected to the casing and associated with each of the guide means and the respective transducers and pusher members, the actuator having a piston rod disposed generally along the longitudinal axis;
an arm pivotally interconnecting the piston rod of each actuator and the associated transducer and pusher member such that movement of the piston rod will cause simultaneous movement of the respective transducer and pusher member outwardly from the casing into engagement with the walls of the bore hole;

a source of hydraulic power fluid connected to the hydraulic actuators for operating the actuators;

means connected to the casing for generating a sonic signal in the formation around the bore hole;

means carried by said casing for acoustically insulating said transducers from said signal generating means; and, means connected to the transducers for measuring the time interval required for the sonic signal to travel through the formation between the transducers.

References Cited

UNITED STATES PATENTS

| | | | |
|---|---|---|---|
| 2,191,119 | 2/1940 | Schlumberger | 340—18 |
| 2,315,931 | 4/1943 | Burt et al. | 166—122 |
| 2,428,168 | 9/1947 | Loper | 340—18 |
| 2,831,540 | 4/1958 | Huber | 166—122 |
| 2,876,413 | 3/1959 | Saurenman et al. | 324—10 |
| 2,892,501 | 6/1959 | Boller | 166—100 |
| 2,994,398 | 8/1961 | Engle et al. | 181—53 |

SAMUEL FEINBERG, *Primary Examiner.*

KATHLEEN H. CLAFFY, BENJAMIN A. BORCHELT, *Examiners.*

W. KUJAWA, *Assistant Examiner.*